United States Patent [19]
Cooper et al.

[11] Patent Number: 5,245,872
[45] Date of Patent: Sep. 21, 1993

[54] DEVICE FOR PRECISE MEASUREMENT OF FORCE

[76] Inventors: William L. Cooper, 2-1171 E. Cliff Dr., Santa Cruz, Calif. 95062; Frank E. Russo, 325 Arthur Ave., Aptos, Calif. 95003; Craig A. Castle, 2220 Cutler St., Simi Valley, Calif. 93065; Robert S. Smith, 1263 Emory St., San Jose, Calif. 95126

[21] Appl. No.: 739,618

[22] Filed: Aug. 1, 1991

Related U.S. Application Data

[63] Continuation-in-part of Ser. No. 729,166, Jul. 12, 1991.

[51] Int. Cl.⁵ ................................................ G01L 1/04
[52] U.S. Cl. ................................. 73/161; 73/862.381
[58] Field of Search .................... 73/862.61, 862.621, 73/862.53, 862.627, 862.634, 580, 161; 177/212, DIG. 6, 210 C, 211

[56] References Cited

U.S. PATENT DOCUMENTS

| | | | |
|---|---|---|---|
| 2,577,805 | 12/1951 | Pidduck | 73/161 |
| 3,392,576 | 7/1968 | Hollander, Jr. | 73/862.68 |
| 3,646,810 | 3/1972 | Taysom et al. | 73/769 |
| 4,503,923 | 3/1985 | Maaz | 177/212 |
| 4,630,473 | 12/1986 | Park et al. | 73/161 |
| 4,825,968 | 5/1989 | Maaz et al. | 177/DIG. 6 |
| 5,070,489 | 12/1991 | Perry | 369/44 |

FOREIGN PATENT DOCUMENTS 0714142 10/1980 U.S.S.R. ................................ 73/161

OTHER PUBLICATIONS

Ex parte Klumb, 159 USPQ694 (1968).

Primary Examiner—Richard E. Chilcot, Jr.
Assistant Examiner—R. Biegel
Attorney, Agent, or Firm—Robert Samuel Smith

[57] ABSTRACT

A device for measuring force of bending of a head-flexure assembly by a given amount characterized by the distance between a clamping surface for one end of the flexure and the plane (recording surface) in contact with the head at at the other end of the flexure. The device includes a load cell with a cell reference surface adjustably supported on a cell base which is slidably mounted on a main base. Adjustment of the location of the cell reference surface with respect to the clamp surface is achieved by a shaft threaded into the load cell with a first thread and threaded into the main base with a second thread so that by turning the shaft, the distance between the two reference surfaces can be very accurately adjusted. When the load cell is deformed by application of the head loading force to the cell reference surface, a signal from the load cell actuates a mechanism maintaining the cell reference surface in its initial location thereby maintaining the initial flexion of the flexure.

10 Claims, 3 Drawing Sheets

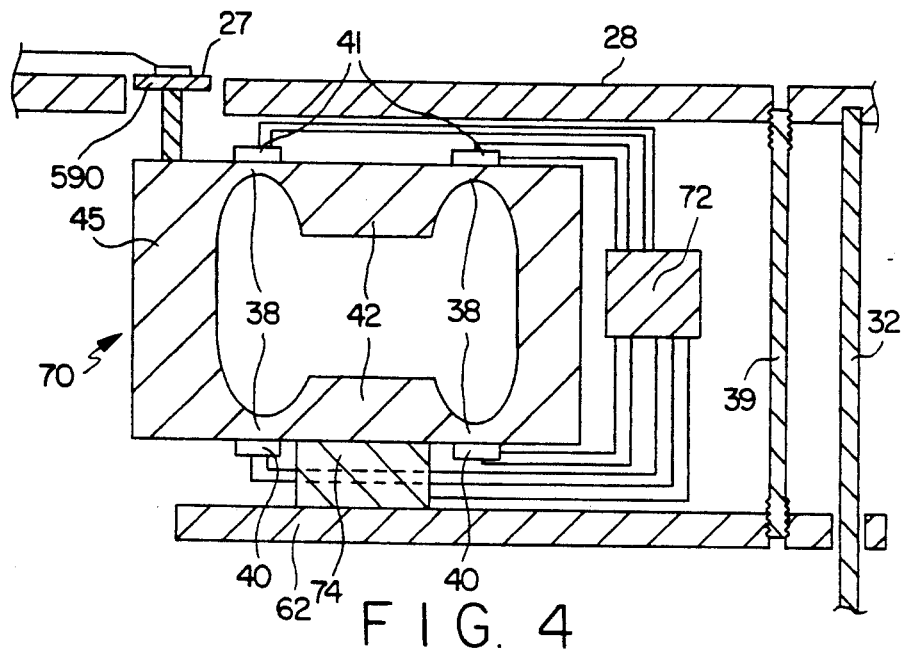
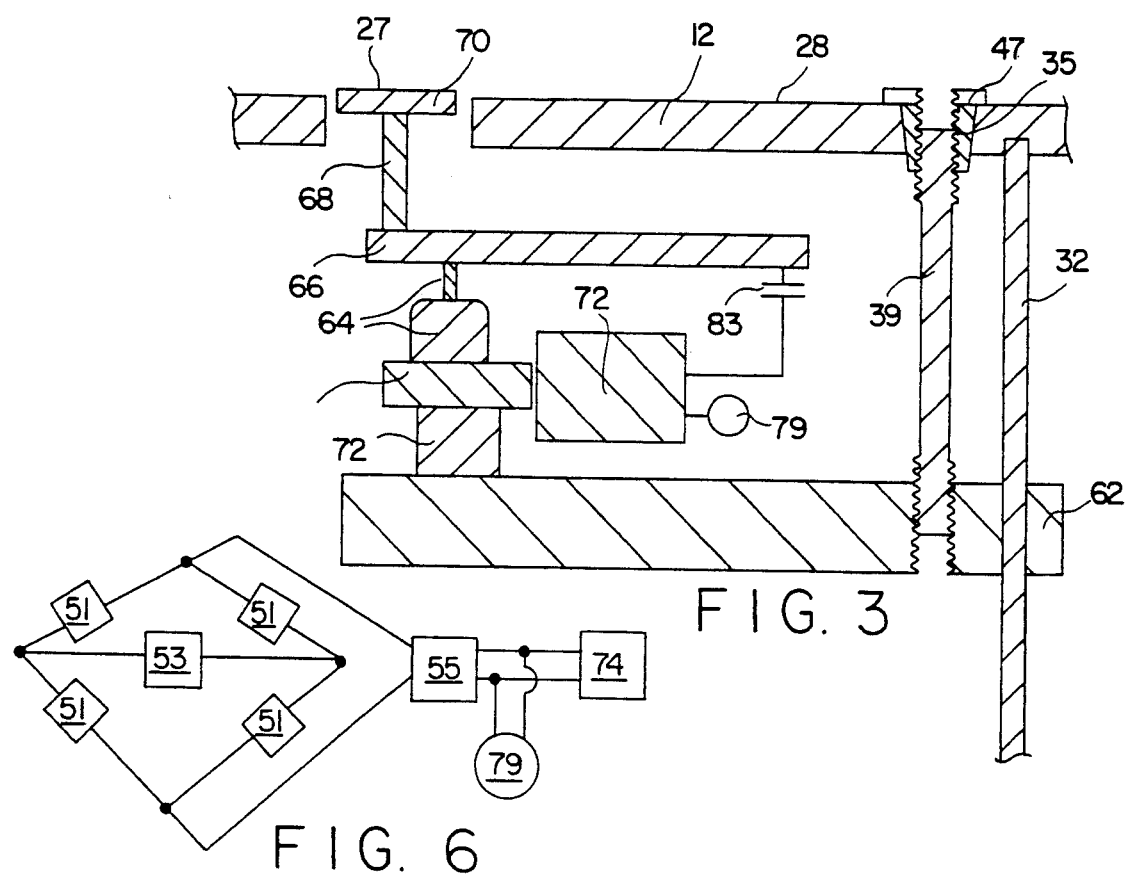

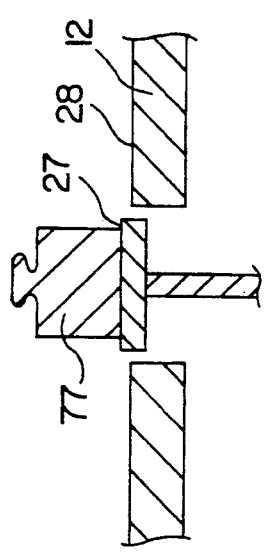
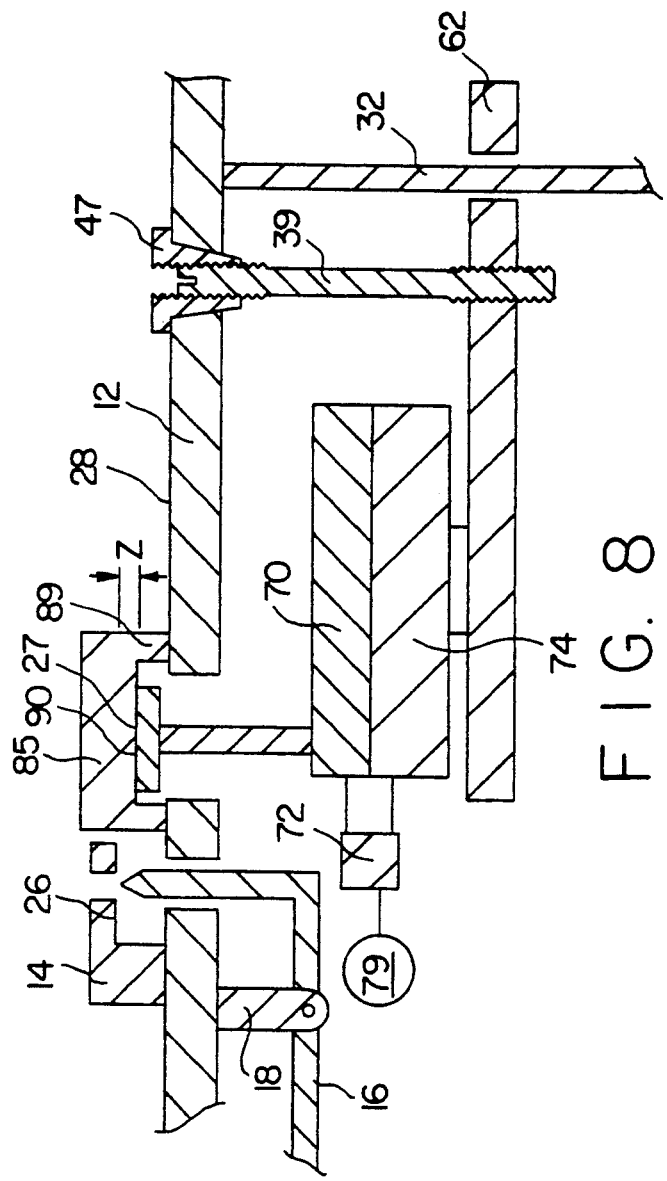

DEVICE FOR PRECISE MEASUREMENT OF FORCE

BACKGROUND

CROSS REFERENCE TO PREVIOUS APPLICATION

This application is a continuation-in-part of application Ser. No. 07/729,166 filed Jul. 12, 1991.

FIELD OF THE INVENTION

This device relates to devices for measuring force and particularly to a device that measures the force exerted by the flexure that supports a magnetic recording head.

PRIOR ART AND INFORMATION DISCLOSURE STATEMENT

The problem of measuring very small forces is very important in a number of industries and particularly in the jewelry industry and in magnetic recording as performed with hard disk drives. In these industries, a typical requirement is to measure a few grams total force to an accuracy of a few milligrams.

With the development of solid state technology, new techniques have been developed to meet these requirements.

For example, one approach, incorporated into a scale sold by by the AND Inc. (Milpitas, Calif.) for the jewelry industries, involves the use of a very sensitive strain gage bridge including four strain gages arranged as the four arms of a wheatstone bridge. One strain gage is mounted on each leg of a four sided frame. A section of each leg adjacent to the strain gage is thinned to the extent that when a force is applied to a location on the frame in the plane of the frame, strain is amplified in the thinned region with the result that a force can be measured with the bridge circuit to an accuracy of 10 milligrams.

Another approach, also used in a scale sold by the AND Inc. operates on the principal of a balance including a lever arm and fulcrum in which the unknown weight in the balance pan is on one end of the lever arm, and a voice coil is a part of a restoring force arrangement on the other end of the lever arm. When the unknown weight is placed in the pan, an opti-electronic signal is generated in proportion to the deflection of the pan which, in turn, generates a current in the voice coil that restores the pan to its original position. The restoring current in the voice coil is read out as representing the unknown weight.

A number of disclosures have been made regarding the use of voice coil technology in making small controlled displacements. For example, U.S. Pat. No. 5,070,489 to Perry et al discloses a circuit for driving an actuator for focusing a lens and is hereby incorporated into this specification by reference. In this disclosure, the actuator is the double coil type. A signal is generated by a change in a light signal such as would be generated by a shift in a grating.

Disk files for magnetic recording include one or more magnetic recording heads held against a rotating memory disk. The surface of the head facing the moving disk surface is contoured so that an airbearing is generated at the interface (the region between the two surfaces) that maintains the separation of the two surfaces. The separation for present day disk files is less than five microinches. It must be maintained very accurately, i.e. within a microinch in order to maintain a uniform predictable recording signal from the head and in order to help prevent contact between the two surfaces that would lead to damage of the recording surface. The force that maintains the head at this spacing from the disk is very small, typically 3 to 8 grms. and must be maintained at a precise value.

The standard construction for supporting the head is a leaf spring or flexure of a thin metal sheet, typically about an inch or so long and less than one half an inch wide in todays diskfiles. The head is secured at one end of the broad side of the flexure facing the disk. The other end of the flexure is clamped to the arm of an actuator that positions the head on the desired recording track on the disk surface. The precise value of force applied by the head against the disk can only be achieved by accurately positioning the clamping location above the disk surface (called the "Z" height) and by accurately controlling various factors that influence fexing of the flexure. These factors include dimensions of the flexure (including thickness), the location of the head on the flexure relative to the clamping location, residual stresses in the flexure that might affect flatness of the flexure in the unstressed condition, etc. Because of the criticality of the head force load and the numerous factors that must be controlled to achieve the required head load force, it is standard practice in the disk file industry to test the flexing properties of each head-flexure assembly before it is built into the diskfile assembly.

A device and method for testing the force characteristics of the head flexure assembly has been developed by the Automatech Corporation located in Santa Cruz, Calif.

The test device includes a horizontal reference base plate having plate reference surfaces on opposing sides of the plate.

A load cell is mounted on the bottom plate reference surface. The mounting permits adjustment of the distance between a cell reference surface on the load cell and the plate reference surface. The load cell is the four element straingage type. The load to be measured is applied against the cell reference surface thereby generating a signal in the bridge which is interpreted as force.

The device is calibrated by resting a precisely known calibrating weight on the cell reference surface then adjusting electronic parameters of the measuring circuit until the displayed value of force equals the calibrating weight. This procedure ensures that the cell display will present an accurate measurement of the force exerted against the cell reference surface.

Next, a test yoke is placed on the reference surface straddling the cell reference surface so that a reference surface on the yoke faces the cell reference surface. The legs of the yoke have been precisely machined so that the difference between the height of the reference surface on the yoke above the plate reference surface and the height of a flexure clamp surface above the plate reference surface equals the desired "Z" value. Then a screw connecting the cell to the reference plate is turned to bring the cell reference surface into contact with the yoke reference surface.

Contact of the cell reference surface with the yoke reference surface is that position of the screw where the display of force jumps from zero to a value greater than zero.

In order to test the force-displacement properties of the flexure, the flexure is clamped with the flexure clamped against the referenced clamping surface so that the head is in contact with the reference surface of the load cell. The flexure will be strained thereby in accordance with the design requirements of the disk file, and a force will be exerted on the cell reference surface that will be measured by the bridge of strain gages. Flexures that do not display the required force may thereby be rejected from use in the disk file.

The quality control procedure is to place each head-flexure assembly in the calibrated test fixture so that the test device will display a force that must be within prescribed limits in order for it to be accepted for mounting into a disk file.

The testing device for heads described in the foregoing paragraphs is referred to in the industry as a "gramer".

The accuracy of calibrating the device of the prior art is limited by two factors.

One factor is the sensitivity with which an operator can gently bring the cell reference surface up against the yoke reference surface as detected by a sudden jump of the force reading from zero to any value greater than zero. The sensitivity for this type of device is no less than 10 milligrams.

The second limiting factor is that application of force in order to perform the measurement requires that some deflection of the frame supporting the strain gages must occur in order for a force to be registered. This places a further limitation on the accuracy that can be achieved with this design approach because the flexure is no longer deflected by a constant distance equal to the difference in heights determined with the yokes but must also include the amount of deflection of the load cell.

The present trend in disk files is toward ever smaller disk files requiring smaller head loading forces and calibration procedures that are more precise than ten milligrams.

THE INVENTION

OBJECTS

It is an object of this invention to provide a device for accurately flexing a head-flexure assembly with one end of the flexure clamped and the other end secured to the head with the head in contact against a surface and measuring the force exerted by the head against the surface.

It is another object that the force be measured to a greater accuracy than is achieved with devices of the prior art.

It is another object that the device be capable of calibration to an accuracy that is greater than devices of the prior art.

It is another object to be able to compare the forces exerted by two or more flexures when both flexures are flexed an identical amount in accordance with a required standard for flexion, the "Z" height.

SUMMARY

In one embodiment this invention is directed toward a device for clamping one end of a flexure against a clamping reference surface with a head attached to the other end of the flexure and in contact with the reference surface of a load cell such that the vertical distance between the clamping reference surface and the cell reference surface (the "z" height) is constant independent of the force exerted by the head against the cell reference surface and displaying the force against the cell reference surface.

This feature is achieved by applying to the movable support for the load cell assembly a force equal and opposite to the force applied by the head so that displacement of the load cell due to the applied force is compensated for by an equal and opposite force exerted on the load cell support.

This arrangement thereby provides that the forces exerted by a number of flexures can be compared under a condition where all flexures are flexed an identical amount corresponding to a required "Z" height.

An additional feature of this invention is a load cell adjustably secured by a double threaded shaft to a plate support which may be turned to adjust the distance between the reference surface on the load cell and clamping reference surface to a value equal to the required "Z" height. Therefore, the testing "Z" height can be changed in accordance with design requirements of the flexure. The double threaded shaft construction provides a much greater accuracy than is achieved with devices of the prior art.

In one embodiment, the load cell is a frame equipped with strain gages. In another embodiment, the load cell is a lever.

In one embodiment the movable support for the load cell is actuated by a voice coil actuator. In another embodiment, the movable support is actuated by the diaphram of a hydraulic ram.

These alternate constructions indicate that a number of embodiments can be used to achieve the objects of the invention.

DRAWINGS

FIG. 3 shows the invention with a lever type load cell and a capacitive probe to measure force.

FIG. 4 shows a measuring device of this invention in which the load cell is a rectangular frame.

FIG. 6 show a bridge circuit for transmitting the force signal to the movable cell support.

FIG. 7 shows the first step in calibrating the force measuring device.

FIG. 8 shows the second step in calibrating the force measuring device.

DESCRIPTION OF A PREFERRED EMBODIMENT

The following detailed description illustrates the invention by way of example and not by way of limitation of the principles of the invention. This description will clearly enable one skilled in the art to make and use the invention and describes embodiments and modifications including what I presently believe to be the best mode for carrying out the invention.

Figure 1:
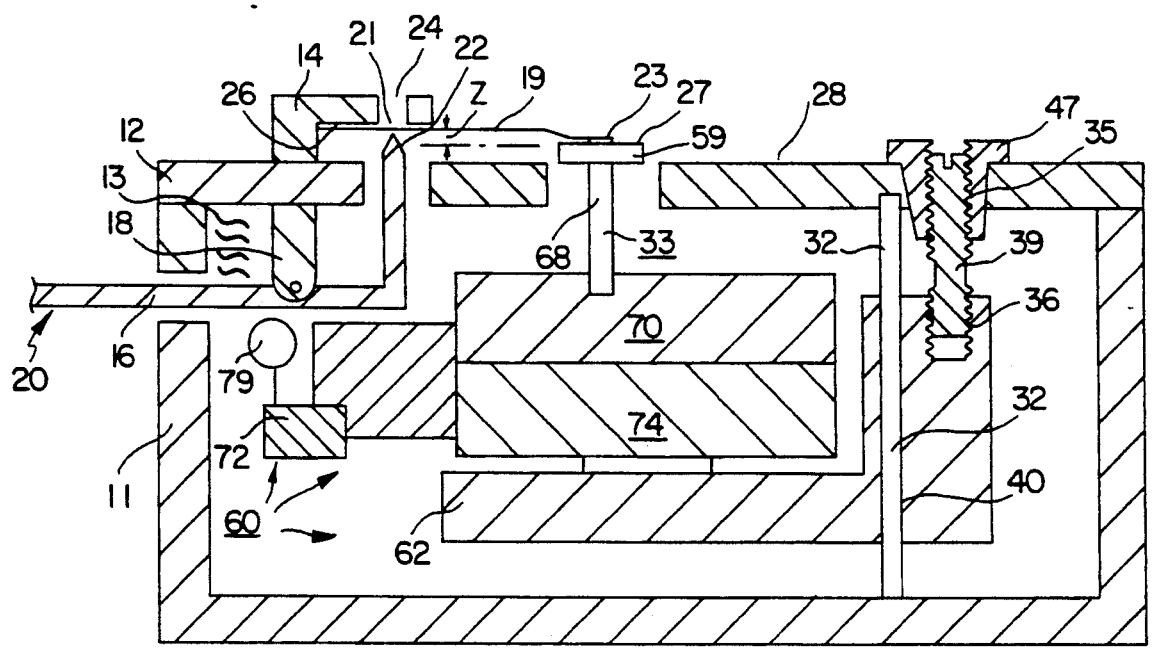
FIG. 1 shows a cross sectional view of the force measuring device of this invention in which the load cell is represented in block diagram form.

Turning to a description of the drawings, FIG. 1 shows one embodiment of a force measuring device of this invention. There is shown supported on a base 11, a reference plate 12 having a clamping fixture including a fixed jaw 14 and a movable jaw 16 that is hingably supported on the reference plate 12 by fulcrum 18 and spring loaded to the closed position by spring 13. The jaws are opened by pressing on movable jaw 16 at location 20 to permit insertion of the clamped end of the flexure 19 between the jaws where it is centered by taper end 22 of movable jaw 16 centered to hole 24 in jaw 14 and hole 21 in the flexure 19. The surface at the end of the flexure is clamped against clamp reference surface 26 which is spaced very accurately above plate reference surface 28 according to the required amount of bend in the flexure. The load cell assembly 60 is slidably mounted on a post 32 secured at one end to the base plate 12. The recording head 23 of the head-flexure assembly rests against a cell reference surface 27 of a stool 33 extending from load cell assembly 60. Therefore, the height of cell reference surface 27 above reference surface 28 can be selected by a coarse adjustment made by turning bushing 47 which is tapered to fit a hole in plate 12 and a fine adjustment made by turning shaft 39 which is threaded into bushing 47 with one thread 35 and into the cell base 62 of load cell 60 with another thread 36. Bushing 47 is tapered to provide a close fit between the bushing 47 and plate 12.

One important feature of the invention provided by the above construction is the double threaded shaft 39 which permits very accurate positioning of the cell reference surface 27 with respect to the clamp reference surface 26 so that the test "z" height is controlled very accurately to begin the test.

FIG. 1 also shows the second important feature which is the means by which any number of flexures may be flexed identically to a required standard of flexion, independent of variation in flexing characteristics between flexures such as a difference in force constant of th flexure brought about by inadvertent bending of the flexure prior to its insertion into the clamp. Under this desired test condition, the force exerted by the head on a load cell reference surface may be displayed to an operator for comparison to a standard value of force.

FIG. 1 illustrates the second feature by showing as a block diagram the load cell 70, which generates a signal proportional to force applied to the cell reference surface 27, a means to display the signal 79 as applied force, a means 72 to convert and transmit the signal to a means 74 for generating a restoring force between a cell base 62 and the load cell 70 in proportion to the applied force thereby maintaining the cell reference surface 27 in its initial position.

Several versions of a load cell 70, signal transmitter 72 and a positioning device 74 may be selected as discussed in following paragraphs.

Figure 2:
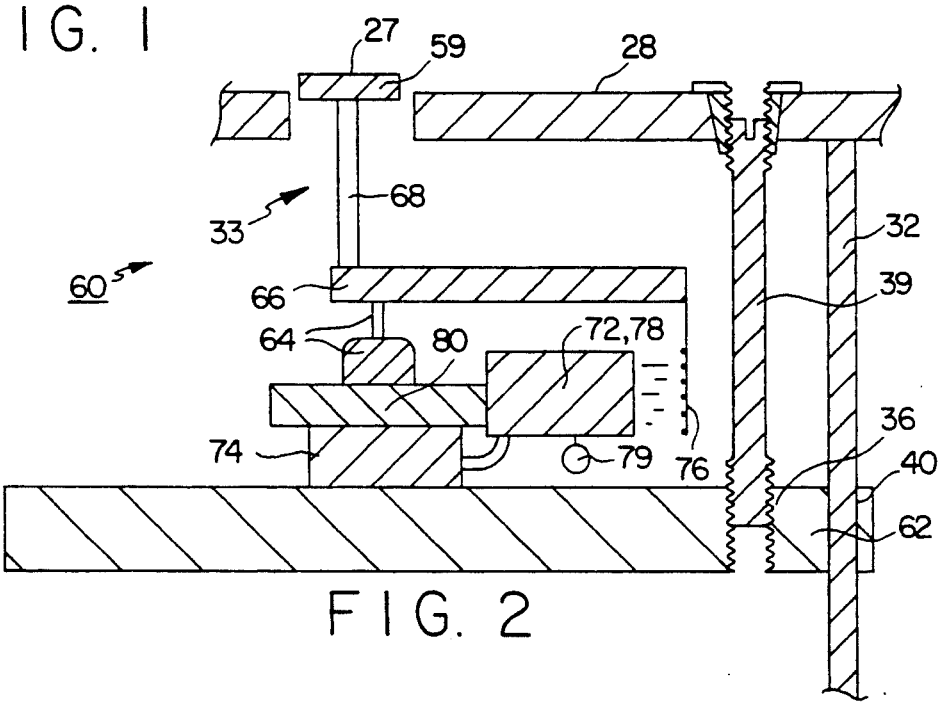
FIG. 2 shows the invention with a lever type of load cell and grating position detector.

For example, FIG. 2 shows an assembly including a cell base plate 62 which has a threaded hole 36 for receiving the bottom end of the double threaded adjustment shaft 39 and a close fitting bored hole 40 for slidably receiving post 32 so that vertical positioning of load cell assembly 60 is provided by turning shaft 39 in order to provide the required "z" height to start the test. A lever 66 is resiliently supported on a fulcrum 64 which is adjustably supported by the positioning device 74.

The term, resiliently supported in the context of this application is taken to mean that the lever is supported in a horizontal position by the fulcrum in the absence of an applied force. When a force is applied on one end of the lever, the fulcrum 64 bends and the lever is tipped by a distance proportional to the force.

The short end of the lever 66 supports a stool 33 having a top cell reference surface 27 including a rod section 68 secured in the lever 66 and a button section 59 on the top of which is located cell reference surface 27.

In the embodiment shown in FIG. 2, an optical grating 76 is attached to the long end of the lever 66. An optical detector 78 is attached to the fulcrum base 80. The optical detector 78 is of the type disclosed in U.S. Pat. No. 3,756,723 which is hereby incorporated by reference into this specification. The fulcrum base 80 is supported on the repositioning device 74.

When a force is applied to cell reference surface 27, the lever arm 66 is displaced (i.e., the resilient section of fulcrum 64 bends) causing grating 76 to shift relative to the fulcrum base 80. A signal is emitted by signal convertor 78 that is proportional to this displacement of the grating 76. The signal is transmitted by device 72 to restoring device 74 which applies a restoring force on the fulcrum base opposing the applied force so as to maintain the reference surface 27 in its initial position at the required distance from the clamp reference surface 26 measured vertically to the cell reference surface 27.

The applied force signal is displayed to the operator by display 79 thereby indicating the applied force.

Another method for generating a signal proportional to force is presented in FIG. 3 which shows the same lever arrangement as in FIG. 2 except that a capacitive probe 83 has one electrode secured to the end of the lever which is displaced by deflection of the end of the lever arm 68 relative to a second electrode secured to the fulcrum support base 80 due to force applied to the cell reference surface 27.

The use of capacitive probes to generate a signal proportional to displacement is discussed in the document, "Capacitive Dimensional Measurement Theory and Application" by J. Akers available from Dimensional Control Corporation, 1403 Industrial Road, San Carlos, Calif., 94070 and is hereby incorporated by reference into this specification.

Another type of load cell is shown in FIG. 4 and includes a frame 45 having four sides with two narrow sections 38 on each of two opposing legs 42. Four strain gages 40 and 41 are shown with a strain gage located adjacent to each narrow section 38. The frame base is adjustably supported on the load cell base 62 by positioning means 74. To begin the test, the vertical location of the cell base 62 is first positioned by adjustment of double threaded screw 39 in order that the cell reference surface 27 be positioned with respect to the clamping surface (26 in FIG. 1) in accordance with the required "Z" height of the flexures to be tested.

When force is applied to the cell reference surface 27, thereby straining the frame, a signal is emitted by the bridge proportional to the strain which is amplified and applied to the positioning means which adjusts the position of the frame base thereby maintaining the cell reference surface in its initial position.

Any one of a variety of positioning devices may be used to retain the cell reference surface in a constant position, all of which are embodiments of this invention.

Figure 5:
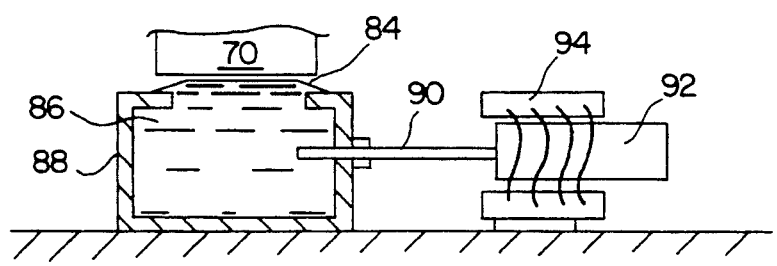
FIG. 5 shows a hydraulic movable support for the load cell.

For example, FIG. 5 is an embodiment in which the load cell 70 is supported on a diaphram 84 over a hydraulic cavity 86 in housing 88. A rod 90 has one end protruding into the housing and a second end comprising the plunger 92 in a voice coil 94. Signal proportional to the strain is transmitted by the detector to the voice coil 94 causing the plunger 92 to penetrate further into the cavity thereby forcing the diaphram 84 to move the load cell base and in the direction of its initial position.

The signal converting and transmitting means may be an adaptation of a number of circuit configurations however a bridge circuit as shown is preferred presently.

FIG. 6 shows a bridge circuit adapted to the embodiment discussed in connection with FIG. 4 in which the components 51 of the bridge represent the four strain gages 41 and 40. The bridge is powered by a power supply 53. Imbalance of the strain gages due to application of force applied to the cell reference surface sends a signal to the amplifier 55 whose output is connected to the positioning device 74. The power delivered to the positioning device 74 is displayed by meter 79 indicating the magnitude of force applied on the cell reference surface 27.

A bridge circuit for responding to changes in capacitance such as used in connection with the capacitance probe 83 shown in FIG. 3 is discussed in many texts on measurement of capacitance such as "Principles of Transistor Circuits" by R. Shea published by Wiley and Sons, N.Y. and is hereby incorporated by reference into this specification.

The method of calibrating the device is described with reference to FIG. 7 and FIG. 8.

Referring to FIG. 7, in the first step a standard weight 77 (e.g., 100.000 grams) is placed on the reference surface 27 and adjustments are made to the circuit (amplifier and/or display) to display, (e.g., 100.000 grams.) the standard weight on meter 79.

As shown in FIG. 8, in the second step the weight is removed and a yoke 85 is placed on the reference surface 28 of the main base plate 12. The legs 89 of the yoke 85 have been precisely machined to establish the required distance, between plate reference surface 28 and yoke reference surface 90. First, bushing 47 is turned while preventing shaft 39 from turning thereby coarsely adjusting the position of the load cell assembly. Then, with the bushing stationary, the shaft 39 is turned causing the load cell assembly all mounted on cell base 62 to slide on the shaft 32 for fine adjustment to a position where cell reference surface 27 barely touches yoke reference surface 90 as indicated by the jump of the display 79 (FIG. 2) from zero to a value "greater than zero". The device has now been fully calibrated.

Referring to FIG. 1, the force exerted by the flexures may now be measured by clamping the clamping end of the flexure 19 between the clamping jaws, 14 and 16, with the head 23 resting against the cell reference surface 27.

The ability to adjust the position of the cell reference surface 27 by controlling the force of the cell reference surface against the yoke reference surface with the double threaded shaft 39 is a major feature of this invention in achieving very accurate positioning of the cell reference surface. A number of thread combinations could be selected to produce the required effect of small axial displacement of the shaft and load cell with a given rotation of the shaft but to illustrate, if thread 35 were thirty six threads per inch and thread 36 were forty threads per inch, then rotating the shaft 33 one complete turn of shaft 39 would shift the cell reference surface by only .002 inches thereby providing that adjustments of calibration in the range of one milligram can be achieved.

In the foregoing paragraphs, an embodiment has been described which meets the objects of the invention. A device has been described for measuring force applied by a head flexure when the flexure is flexed by a constant amount independent of the properties of the flexure such as spring constant. Accuracy of calibration of the device can be controlled to a fine degree by preadjusting the location of reference surfaces by turning a double threaded shaft. Modifications to the embodiment may occur to one after studying the description and drawings which are within the scope of the invention. For example, the double threaded shaft may be replaced by a first tube having one thread on the inside and another thread on the outside with the stool providing the cell reference surface supported on a second tube that is threaded onto the outside of the first tube. The load cell may comprise a different arrangement of strain gages. The reference plate may be replaced by a reference base having a shape different from a plate. The position maintaining mechanism that supports the load cell may be a voice coil linear actuator. We therefore wish our invention to be defined by the scope of the appended claims and in view of the specification if need be.

We claim:

1. A device for measuring an absolute force exerted by a flexure having a first end to which a magnetic recording head is secured and a second end, said force to be measured when said flexure is flexed to a predetermined shape, said device comprising:

a main base;
   a cell base;
   a means for adjustably securing said cell base onto said main base;
   a load cell member having a cell reference surface in an initial position;
   a means for generating an applied force signal proportional to a force applied against said cell reference surface and converting said applied force signal to a restoring signal;
   a restoring means secured to said cell base and supporting said load cell member for restoring said cell reference surface to said initial position in response to said restoring signal;
   means connected to said signal generating and converting means for displaying said restoring force signal;
   a clamp means mounted on said main base and having a fixed jaw with a fixed clamp reference surface and a movable spring loaded jaw for clamping said second end of said flexure against said fixed clamp reference surface with said head in contact with said cell reference surface;
   said adjustably securing means adapted to position said cell base with said cell reference surface in said initial location wherein a distance measured vertically between said fixed clamping reference surface and said cell reference surface is adjustably preset at a desired value corresponding to said predetermined shape of a flexure providing that, with said second end of said flexure clamped against said fixed clamp reference surface by said spring loaded movable jaw, and said head in contact with said cell reference surface in said initial location said flexure is flexed to said predetermined shape and applies force on said load cell with said restoring means maintaining said cell reference surface in said initial position and with said display means displaying said restoring force signal.

2. A force measuring device as in claim 1 wherein said adjustably securing means comprises:

said main base having a surface with a first main base hole;

a bushing slidably engaged in said first main base hole and having a hole with a first thread extending from one end to another end of said bushing;

said cell base having a surface with a first cell base hole having a second thread and aligned with said hole in said bushing and said cell base surface having a second cell base hole;

first shaft having one end secured in said main base and another end slidably inserted in said second cell base hole;

a second shaft having said first thread on one end threaded into said hole in said bushing and another end threaded with said second thread and threaded into said second cell base hole;

said first and second hole and said shafts operably arranged in combination with one another to position said cell base on said second shaft by turning said first shaft thereby permitting adjustment of said cell reference surface to said initial location;

3. A force measuring device as in claim 1 wherein said said load cell member comprises:

a frame having a plurality of legs, each said leg having two ends, each said leg end connected to one other said leg end in an operable arrangement to provide said cell reference surface;

a power supply;

a plurality of strain gages secured to said frame in an operable combination with one another and said frame and power supply to provide a terminal connected to said signal receiving means such that when a force is applied to said cell reference surface, said frame is deformed thereby straining said strain gages and providing that a signal proportional to said force be generated at said terminal.

4. A device for measuring force as in claim 3 wherein said strain gages are connected to one another and said power supply to form a wheatstone bridge.

5. A device for measuring force as in claim 1 wherein said adjustably restoring means includes a voice coil operably arranged to be supported by said cell base means and to adjustably support said load cell means having terminal for receiving said restoring signal and maintaining said cell reference surface in said initial location.

6. A device as in claim 1 wherein said adjustably restoring means comprises:

a hydraulic cylinder supported on said cell base and including a housing enclosing a cavity with a first and a second opening through said housing thereby permitting said cavity to communicate outside said housing;

a diaphram covering said first opening and having a surface in supporting contact with said load cell;

a rod having one end extending through said second opening and a second end extending into a voice coil supported by said cell base means;

said voice coil having terminals connected to said signal conversion means for receiving said restoring signal thereby providing that said restoring signal will actuate said diaphram to maintain said cell reference surface in said initial location.

7. A device for measuring force as in claim 1 wherein said load cell member comprises:

a first member having said cell reference surface;

a second member supported by said restoring means;

a deformable connecting member connecting said first and second members such that said first frame member will change position relative to said second frame member when force is applied to said cell reference surface;

said means for generating and converting force signal generates force signal responsive to said position change.

8. A device as in claim 7 wherein said means for generating and converting force signal comprises:

a grating means secured to said first member for intercepting a light beam;

a light beam source secured to said second member for illuminating said grating means;

a photodetector means secured to said second member for emitting said force signal in response to changes in said intercepted light beam;

a signal amplifying means electrically connected to said photoconductor means and to said restoring force means for converting said force signal to said restoring force signal.

9. A device for measuring force as in claim 8 wherein:

said first member is a lever having said cell reference surface on one end and said grating means secured to another end;

said second member is a fulcrum base mounted on said base;

said connecting member is a resilient fulcrum providing that when a force is applied to said cell reference surface by said head said lever means will change position thereby sending a force signal to said signal receiving means.

10. A device as in claim 7 wherein said means for detecting position change comprises:

a capacitive probe means including two electrodes wherein one said electrode is supported by said first member and said other electrode is supported by said second member;

a circuit means for generating a capacitance change signal and converting said capacitance to said restoring signal and a terminal connected to each said electrode thereby providing a restoring signal when said load cell first member changes location relative to said second load cell member.

* * * * *